United States Patent [19]
Awata et al.

[11] Patent Number: 5,638,409
[45] Date of Patent: Jun. 10, 1997

[54] DATA RECEIVING DEVICE FOR REPRODUCING A RECEIVED SYMBOL FROM A RECEIVED DATA SIGNAL

[75] Inventors: Yutaka Awata; Nobukazu Koizumi; Yasuo Ohtomo; Mitsuo Kakuishi, all of Kawasaki, Japan

[73] Assignee: Fujitsu Limited, Kanagawa, Japan

[21] Appl. No.: 342,105

[22] Filed: Nov. 18, 1994

[30]  Foreign Application Priority Data

Mar. 25, 1994 [JP] Japan ................................. 6-054281

[51] Int. Cl.$^6$ ............................................... H04L 7/033
[52] U.S. Cl. ............................ 375/355; 375/348; 375/376
[58] Field of Search ................................. 375/232, 233, 375/327, 344, 348, 350, 355, 376; 329/307–309; 331/1 R, 1 A, 25, 32; 327/156

[56]  References Cited

U.S. PATENT DOCUMENTS

| | | | |
|---|---|---|---|
| 4,334,313 | 6/1982 | Gitlin et al. | 375/355 |
| 4,590,602 | 5/1986 | Wolaver | 375/376 |
| 4,726,043 | 2/1988 | Levesque | 375/344 |
| 4,958,228 | 9/1990 | Kutsuki | 375/376 |
| 5,216,554 | 6/1993 | Schneider | 375/376 |
| 5,376,894 | 12/1994 | Petranovich | 375/324 |
| 5,471,508 | 11/1995 | Koslov | 375/344 |
| 5,537,419 | 7/1996 | Parr et al. | 370/100.1 |

FOREIGN PATENT DOCUMENTS

| | | |
|---|---|---|
| 4157836 | 5/1992 | Japan . |
| 4245809 | 9/1992 | Japan . |

*Primary Examiner*—Young T. Tse
*Attorney, Agent, or Firm*—Helfgott & Karas, P.C.

[57]  ABSTRACT

A data receiving device for reproducing a received symbol from a received data signal, includes a timing recovery circuit for controlling a phase of sampling the received data signal, by using pre-cursor information, the timing recovery circuit produces sampling phase control information by eliminating a high frequency component for the pre-cursor information, accumulating eliminated output, comparing accumulated output with a positive or a negative threshold value and subtracting the threshold value from compared output. The data receiving device further includes a masking circuit for masking the sampling phase control information when no-signal data or frame is detected in the received data signal.

7 Claims, 16 Drawing Sheets

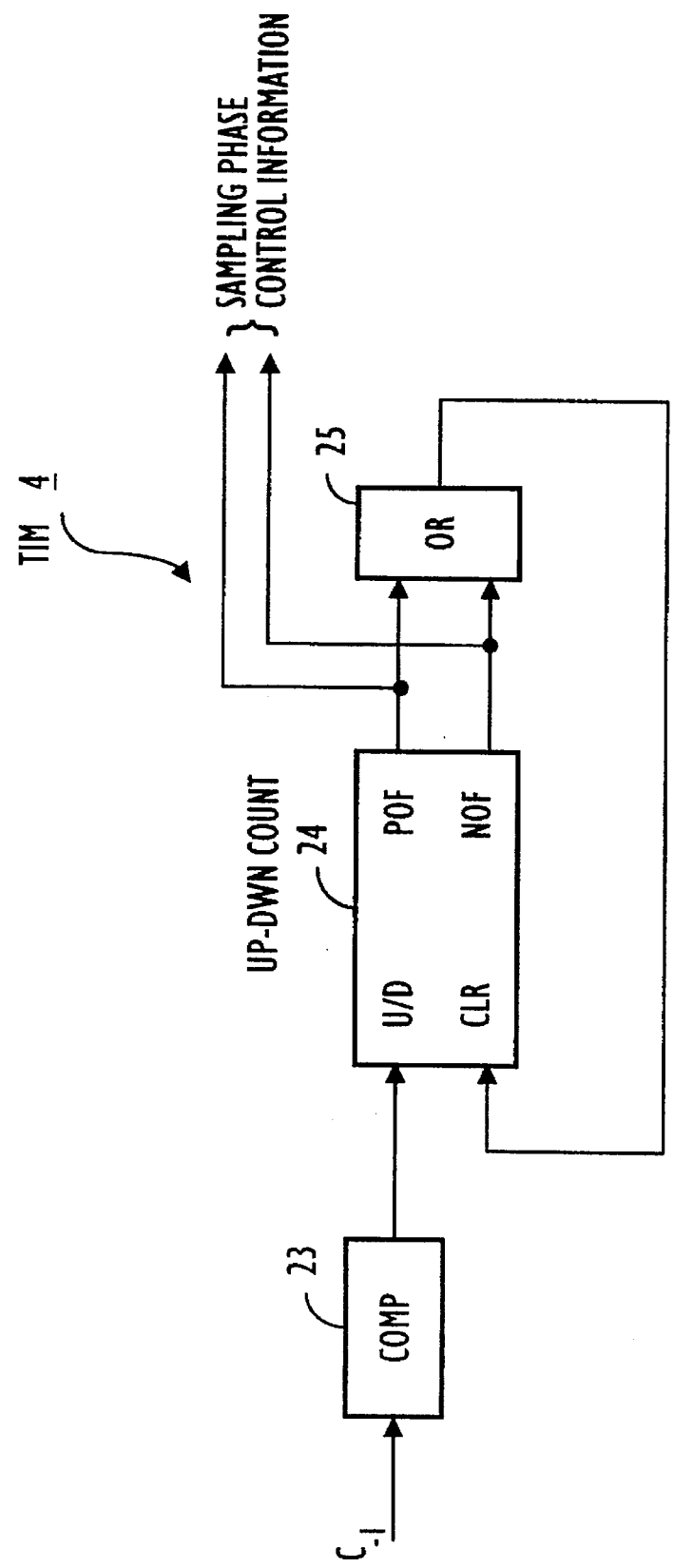

DATA RECEIVING DEVICE FOR REPRODUCING A RECEIVED SYMBOL FROM A RECEIVED DATA SIGNAL

BACKGROUND OF THE INVENTION

1. Field of the Invention

The present invention relates to a data receiving device provided on a transmission line transmitting a data-base signal, for reproducing a received symbol from a data signal received at the data receiving device, in particular, the present invention relates to a timing recovery circuit provided to the data receiving device and masking circuits associated with the timing recovery circuit.

At the present time, a data receiving device for reproducing a received symbol from a received data signal transferred through a transmission line such as a subscriber line is developed by virtue of remarkable progress in LSI and digital signal processing technique.

When the data receiving device receives the data signal, an analog-to-digital circuit in the data receiving device performs sampling of the received data signal, and a phase of the sampling is shifted so as to produce the received symbol properly. The shift of the sampling phase is performed by using a pre-cursor tap coefficient of an impulse response provided in consideration of characteristics of the data signal to be received and the transmission line for transmitting the data signal. A timing recovery circuit is provided to the data receiving device for producing information, which will be called "sampling phase control information" hereinafter, on control of the sampling phase. Receiving the sampling phase control information, the sampling phase is shifted forward or backward at the analog-to-digital circuit so that the received symbol is reproduced from the received data signal properly. The sampling phase has been required to be controlled correctly and at a high speed as much as possible.

2. Description of the Related Art

FIG. 1 is a block diagram illustrating a data receiving device (101) of the related art. As shown in FIG. 1, the data receiving device 101 consists of an analog-to-digital converter (A/D) (1), a feed-forward equalizer (FFE) (2), an impulse response estimating unit (IRE) (3) and a timing recovery circuit (TIM) 4.

When a data signal (Dt) arrives at the data receiving device 101 through a transmission line not depicted in FIG. 1 at a time "t", Dt is fed to A/D 1 for converting Dt to a numerated sampled digital signal with a period (T) of symbols in Dt. The period T will be called a "sampling period" hereinafter. The sampled digital signal is sent to FFE 2 in which the sampled digital signal is equalized in consideration of compensating characteristics of the transmission line and an impulse response to the data signal Dt and the transmission line so that a pre-cursor of the impulse response crosses a zero-cross point of the impulse response. Wherein, the compensating characteristics for the transmission line are considered to compensate signal distortion due to, for example, frequency characteristics of the transmission line, and the impulse response is considered to eliminate intersymbol interference occurring in the data signal transferred through the transmission line. The impulse response will be detailed later in reference to FIG. 2. The FFE 2 produces an equalized output Xt which is sent to IRE 3. In IRE 3, an intersymbol interference component of Dt is removed from the equalized output Xt and a received symbol a is produced under a decision made in accordance with a main cursor of the impulse response. A pre-cursor signal exhibiting the pre-cursor is also output from IRE 3 to TIM 4 as timing information. Receiving the pre-cursor signal, TIM 4 produces sampling phase control information and sends the information to TIM 4. Receiving the sampling phase control information, the sampling phase is shifted at A/D 1 with the sampling period T repeatedly until at is produced properly.

FIG. 2 shows the impulse response provided in consideration of the transmission line and apparatus connected with the transmission line. As shown in FIG. 2, the impulse response is represented by a train of fractional impulse responses $h_{-1}, h_0, h_1, h_2, h_3, h_4, h_5 \ldots$ separated with the sampling period T.

Generally, when a symbol in a data signal is composed of, for example, square wave signals and transmitted through a transmission line, the data signal is distorted in wave shape, due to characteristics of the transmission line and intersymbol interference. In the data receiving device 101, the former distortion is equalized by FFE 2, however, the latter distortion is equalized by using the impulse response.

In the data receiving device 101, since the received data signal Dt includes the symbols having the sampling period T, it can be considered that the received data signal Dt is equal to convolution of the symbol and the fractional impulse responses $h_{-1}, h_0, h_1, h_2, h_3, h_4, h_5 \ldots$ shown in FIG. 2. In FIG. 2, the fractional impulse response $h_0$ is called a main cursor which substantially corresponds to a peak response of the impulse response, $h_{-1}$ is called a "pre-cursor" which appears just before the main cursor $h_0$, and $h_1, h_2, h_3, h_4, h_5, \ldots$ are called "post-cursors" which appear after the main cursor $h_0$.

When the impulse response shown in FIG. 2 is provided for the received data signal Dt and the transmission line through which the received data signal Dt is transmitted, it is well known that when the pre-cursor $h_{-1}$ is used as a timing information and the sampling phase is controlled by using the timing information until the pre-cursor $h_{-1}$ coincides with the zero-cross point, the received data signal Dt can be sampled with an optimum sampling phase.

FIG. 3 is a block diagram of a decision feedback equalizer (DFE) (3A) which is a first example of IRE 3. In FIG. 3, receiving the equalized output Xt from FFE 2, DFE 3A produces the received symbol a and a pre-cursor signal ($C_{-1}$ signal) as the timing information.

When DFE 3A receives the equalized output Xt from FFE 2, a subtracter (11) subtracts Rt, which is an intersymbol interference component obtained by using the post-cursors, from the equalized output Xt, producing an equalized output Yt. Receiving the equalized output Yt, a deciding circuit (DECIDE) (12) produces the received symbol at under decision made by using a threshold value obtained from the main cursor.

The equalized output Yt is also sent to a subtracter (13) at which an error component et is produced by subtracting a multiplying result obtained at a multiplier ($21_1$) by multiplying at by a tap coefficient $C_0$ of the main cursor, from Yt. After delaying the error component et at a register (14) as much as the sampling period T, a residual error $e_{T-1}$ is produced at a subtracter (15) by subtracting an intersymbol interference component due to the pre-cursor, from the delayed et. Wherein, the intersymbol interference component due to the pre-cursor is produced at a multiplier (21) by multiplying at by a tap coefficient $C_{-1}$ of the pre-cursor. It can be realized from the above description that the residual error $e_{T-1}$, is an error obtained by subtracting the intersymbol interference components due to the pre-cursor and the post-cursors, from the equalized output Xt.

On the other hand, in DFE 3A shown in FIG. 3, tap coefficients $C_{-1}, C_0, C_1, C_2, \ldots$ are updated in accordance with the following steps: at a register ($16_1, 16_2, 16_3 \ldots$), received symbols $a_{T-1}, a_{T-2}, a_{T-3}, \ldots$ are obtained by delaying the received symbol at, $a_{T-1}, a_{T-2} \ldots$ as much as a timing period T, respectively; at multipliers (17, $17_1, 17_2 \ldots$), multiplied results are obtained by multiplying the residual error $e_{T-1}$ by at, $a_{T-1}, a_{T-2}, \ldots$ respectively; at amplifiers (18, $18_1, 18_2, \ldots$), tap coefficient renewal quantity to be used for respective timing is obtained by multiplying respectively the multiplied results by a step size $\alpha$ which is a parameter for updating the tap coefficients; and at adders (20, $20_1, 20_2, \ldots$), the tap coefficients $C_{-1}, C_0, C_1, C_2, \ldots$ are updated by adding the tap coefficient renewal quantity to tap coefficients delayed as much as the sampling timing period T at resistors (19, $19_1, 19_2, 19_3, \ldots$), respectively.

Then, at the multiplier 21, the intersymbol interference component due to pre-cursor is obtained by multiplying the tap coefficient $C_{-1}$ by the received symbol at, and at a multiplier ($21_1$), an intersymbol interference component due to the main cursor is obtained by multiplying the tap coefficient $C_0$ by the received symbol at.

Furthermore, at multipliers ($21_2, 21_3, 21_4, \ldots$), the intersymbol interference components due to the post-cursors are obtained by multiplying the tap coefficients $C_1, C_2, C_3, \ldots$ by the received symbols $a_{T-1}, a_{T-2}, a_{T-3}, \ldots$ respectively; and at an accumulator ($\Sigma$) (22), the intersymbol interference component Rt is obtained by totaling the intersymbol interference components due to the post-cursors.

The above steps for obtaining intersymbol interference component Rt is based on convolution expressed by $$R_t = \sum_{n=1}^{N} [a_{t-n} \cdot C_n(t)]. \quad (1)$$

Where Rt is the intersymbol interference component at time t, due to the post-cursors, and other Cn (t) and at are also treated as a function of time t respectively.

On the other hand, the equivalent output Yt can be represented as $$Y_t = X_t - R_t,$$

the error component et can be represented as $$e_t = e_{t-1} - a_t \cdot C_0(t),$$

the residual error $e_{t-1}$ can be represented as $$e_{t-1} = e_{t-1} - a_t \cdot C_{-1}(t), \text{ and}$$

the step size a can be obtained as $$C_n(t+1) = C_n(t) + \alpha \cdot a_{T-n-1} \cdot e_{T-1}$$

where n=1~N.

The DFE 3A shown in FIG. 3 composes an adaptive FIR (Finite Impulse Response) digital filter which is non-recursive. When adaptive operation of DFE 3A is over, the values of the tap coefficients $C_{-1}, C_0, C_1, C_2, \ldots$ coincide with the fractional impulse responses $h_{-1}, h_0, h_1, h_2, \ldots$ respectively. Therefore, the values of the tap coefficients $C_{-1}, C_0, C_1, C_2, \ldots$ can be used as the fractional impulse responses $h_{-1}, h_0, h_1, H_2, \ldots$ shown in FIG. 2, and the tap coefficient $C_{-1}$ can be used as the timing information.

FIG. 4 is a block diagram of a timing estimator (3B) which is a second example of IRE 3 and composed of operation circuits such as a decision circuit (DEC) (26), a delay circuit (DELAY) (27), a multiplier (X) (28) and a mean value producer (MEAN) (29).

When the timing estimator 3B receives the equalized output Xt from FFE 2 (see FIG. 1) at a time "t", DEC 26 decides to produce a received symbol at and sends at to the multiplier 28; the equalized output Xt is also sent to DELAY 27 at which Xt is delayed as much as the sampling period T, producing $X_{T-1}$, which is sent to the multiplier 28; the multiplier 28 multiplies at by $X_{T-1}$ and produces a signal at·$X_{T-1}$ which is sent to MEAN 29; and receiving at·$X_{T-1}$ MEAN 29 produces a mean value E [at·$X_{T-1}$] of the signal at·$X_{T-1}$.

Since the equalized output Xt is expressed by convolution of received symbols and fractional impulse responses, Xt can be expressed similarly to equation (1), as follows:

$$X_t = \sum_{k=-1}^{N} [a_{t-k} \cdot C_k] \quad (2)$$
$$= a_{t+1} \cdot C_{-1} + a_t \cdot C_0 + a_{t-1}) \cdot C_1 +$$
$$a_{t-2} \cdot C_2 + \ldots +$$
$$a_{t-N+1} \cdot C_{N-1} + a_{t-N} \cdot C_N$$

Where $C_K$ such as $C_{-1}, C_0, C_1, C_2, \ldots, C_{N-1}$ or $C_N$ is a fractional impulse responses. Therefore, the received symbol at can be decided by virtue of $C_0$ in the same manner as in the description on DFE 3A in reference to FIG. 3.

Substituting the convolution result shown in expression (2) for the mean value E [at·$X_{T-1}$], the mean value E [at·$X_{T-1}$] is expressed as follows:

$$E[a_t \cdot X_{t-1}] = E[a_t \cdot a_t \cdot C_{-1}] + E[a_t \cdot a_{t-1} \cdot C_0] + \quad (3)$$
$$E[a_t \cdot a_{t-2} \cdot C_1] + E[a_t \cdot a_{t-2} \cdot C_1] +$$
$$E[a_t \cdot a_{t-N} \cdot C_{N-1}] + E[a_t \cdot a_{t-N-1} \cdot C_N]$$
$$= E[a_t \cdot a_t] \cdot C_{-1} + E[a_t \cdot a_{t-1}] \cdot C_0 +$$
$$E[a_t \cdot a_{t-2}] \cdot C_1 + E[a_t \cdot a_{t-3}] \cdot C_2 +$$
$$\vdots$$
$$E[a_t \cdot a_{t-N}] \cdot C_{N-1} + E[a_t \cdot a_{t-N-1}] \cdot C_N$$

Since the received symbols at, $a_{T-1}, a_{T-2}, \ldots$, aT-N and $a_{T-N-1}$ are random signals having no auto-correlation, the following mean values in the above expression (3) become zero as:

$$E[a_t \cdot a_{t-1}] = 0;$$
$$E[a_t \cdot a_{t-2}] = 0;$$
$$E[a_t \cdot a_{t-3}] = 0;$$
$$\vdots$$
$$E[a_t \cdot a_{t-N}] = 0; \text{ and}$$
$$E[a_t \cdot a_{t-N-1}] = 0.$$

Therefore, equation (3) is simplified as follows:

$$E[a_t \cdot X_{T-1}] = E[a_t \cdot a_t] \cdot C_{-1}$$

From the above equation, the pre-cursor coefficient $C_{-1}$ is given as follows:

$$C_{-1} = E[a_t \cdot X_{t-1}]/E[a_t^2]. \quad (4)$$

Since the denominator of the right-hand side of equation (4) is not zero, the numerator of equation (4) should be zero for making the pro-cursor coefficient $C_{-1}$ zero. Therefore, as the numerator E [at·$X_{T-1}$] becomes zero, the pre-cursor coefficient $C_{-1}$ becomes zero. This teaches that the means value $E[a \cdot X_{T-1}]$ can be used as the timing information. Receiving the mean value $E[a \cdot X_{T-1}]$, TIM 4 in FIG. 1 performs feedback control to A/D 1 for controlling the sampling phase properly so as to make the mean value zero.

Receiving the pro-cursor tap coefficient $C_{-1}$ from DFE 3A or the mean value $E[a \cdot X_{T-1}]$ from the timing estimator 3B as the timing information, the timing recovery circuit starts to operate so as to produce the sampling phase control information.

FIG. 5 is a block diagram of TIM 4 of the prior art. The TIM 4 consists of a comparator (COMP) (23), an up-down counter (UP-DWN COUNT) (24) and an OR circuit (OR) (25). When the timing information produced from DFE 3A or the timing estimator 3B is sent to TIM 4, COMP 23 compares the timing information with "0" in value. As a result of the comparison, if the value of the timing information is larger than "0", UP-DWN COUNT 24 makes one step increment in counting, and if the value of the timing information is less than "0", UP-DWN COUNT 24 makes one step decrement in counting. When UP-DWN COUNT 24 continues the increment and a counted value exceeds a positive overflow value previously designated, UP-DWN COUNT 24 outputs a forward phase shift signal from a positive overflow terminal (POF), and when UP-DWN COUNT 24 continues the decrement and the counted value falls below a negative overflow value previously designated, UP-DWN COUNT 24 outputs a backward phase shift signal from a negative overflow terminal (NOF). The forward or the backward phase shift signal is sent to A/D 1 as the sampling phase control information.

Since the one step increment or decrement is performed by increasing or decreasing a constant value step by step every the sampling period, TIM 4 continues to send the sampling phase control information to A/D 1, taking a time. The forward and backyard phase shift signals are also sent to OR 25 at which a clear signal is produced and sent back to UP-DWN COUNT 24 every time the phase forward or backward shift signal is sent to A/D 1. In FIG. 5, a terminal named "CLR" is provided to UP-OWN COUNT 24 for receiving the clear signal from OR 25.

In the impulse response in FIG. 2, it can be seen that the sampling phase lags because the fractional impulse response $h_{-1}$ has a positive value. In order to control the sampling phase properly, UP-DWN COUNT 24 must produce the forward phase shift signal until the output from COMP 23 becomes less than the positive threshold value.

In TIM 4 of the prior art, the timing information is counted up or down with constant magnitude, between the positive and negative overflow values. This means that TIM 4 performs integrating operation. Since the timing information $C_{-1}$ is an estimating value including error, the integrating operation is effective in increasing accuracy of the phase control. Therefore, if attention is focused only on increase of the phase control accuracy, the TIM 4 should have a large time constant in the integration by widening an interval between the positive and negative overflow value. However, at UP-DWN COUNT 24, the counting is performed step by step by counting the constant magnitude regardless of magnitude of the timing information and the shift amount is also limited to constant magnitude. Therefore, when the sampling phase is deviated far from the correct phase, it takes a long time to follow up the deviation by counting up or down. In other words, a frequency tolerance capable of phase tracking through the data receiving device is narrow. Thus, there is contradiction that when the interval between the positive and the negative threshold is widen, the accuracy in the timing recovery increases, however, the frequency tolerance capable of phase tracking becomes narrow. This contradiction has been a problem in the timing recovery circuit of the prior art.

Furthermore, there have been other problems regarding stability of the data receiving device. Since the data receiving device forms a PLL (Phase Locked loop) in regard to the timing recovery for the sampling, the data receiving device becomes unstable when the data receiving device receives no data signal in a long time or a frame for informing that the data receiving device is in a transmitting mode of a time compression multiplex system.

SUMMARY OF THE INVENTION

Therefore, a first object of the present invention is to increase accuracy in the control of the sampling phase.

A second object of the present invention is to widen the frequency tolerance capable of phase tracking through the data receiving device.

A third object of the present invention is to bring the data receiving device into a condition of stability regarding the recovery of timing for the sampling when the data receiving device receives no data signal for a long time.

The first and second objects are achieved by improving the timing recovery circuit in the data receiving device, and the third object is achieved by providing two kinds of masking means, first masking means and second masking means, to the data receiving device. The first masking means includes a no-signal detecting circuit and the second masking means includes a frame detecting circuit.

The improved timing recovery circuit consists of: a loop filter for eliminating a high frequency component from the timing information sent from the impulse response estimating unit in the data receiving device to the timing recovery circuit; an accumulator for accumulating outputs of the loop filter and producing an accumulated value; and a comparator for comparing the accumulated value with a constant positive threshold value or a negative threshold value and producing the sampling phase control information when the accumulator value exceeds the constant positive or negative threshold value.

Receiving the timing information from the impulse response estimating unit of the data receiving device, the improved timing recovery circuit produces the sampling phase control information.

Receiving the sampling phase control information, the sampling phase is controlled at the analog-to-digital circuit in the data receiving device, so as to produce the received symbol properly from the received data signal. Either the decision feedback equalizer or the timing estimator can be used as the impulse response estimating unit.

In the improved timing recovery circuit, since the high frequency component is eliminated from the timing information at the loop filter, the accumulated value can be obtained in high accuracy. This results in increasing the accuracy in the control of the sampling phase.

Still in the improved timing recovery circuit, since the output values themselves of the loop filter, which are substantially equal to the values themselves of the timing information, are accumulated, the comparison can be made more quickly than the comparison made by the up-down counter in the timing recovery circuit of the prior art. This results in widening the frequency tolerance capable of phase tracking through the data receiving device.

The first masking means including the no-signal detecting circuit is provided to the data receiving device in combination with the improved timing recovery circuit. When the data receiving device receives continuous no-data signal ("0"), the no-signal detecting circuit detects a state of the continuous no-data signal and masks the timing information, forcibly making the timing information "0". As a result, the sampling phase control information sent from the improved timing recovery circuit to the digital-to-analog circuit holds the sampling phase in what it used to be. This results in locking the sampling phase, bringing the data receiving device into a stable condition of a free running PLL.

The second masking means including the frame detecting circuit is provided to the data receiving device in combination with the improved timing recovery circuit. When the data receiving device operates in a transmitting mode of a time compression multiplex system, the data receiving device receives a frame which teaches that the data receiving device receives no-data signal. Detecting the frame, the frame detecting circuit masks the timing information, forcibly making the timing information "0". As a result, the sampling phase control information holds the sampling phase in what it used to be, bringing the data receiving device into a stable condition of a free running PLL.

BRIEF DESCRIPTION OF THE DRAWINGS

FIG. 5 is a block diagram of a timing recovery circuit (TIM) 4 of the prior art;

DESCRIPTION OF THE PREFERRED EMBODIMENT

Figure 1:
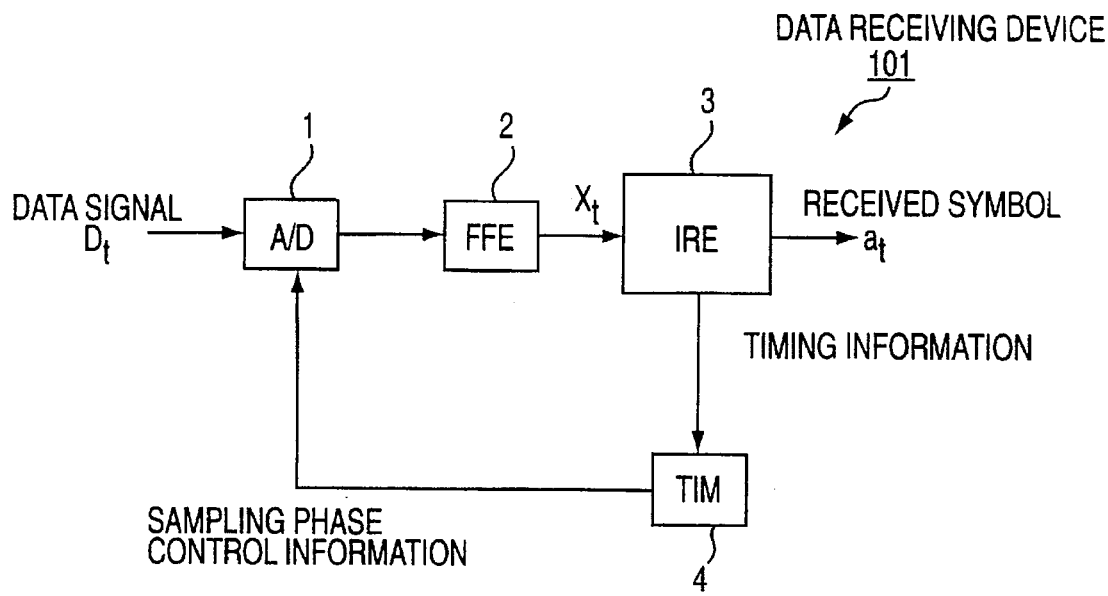
FIG. 1 is a block diagram of a data receiving device 101 of the related art.
Figure 6A:
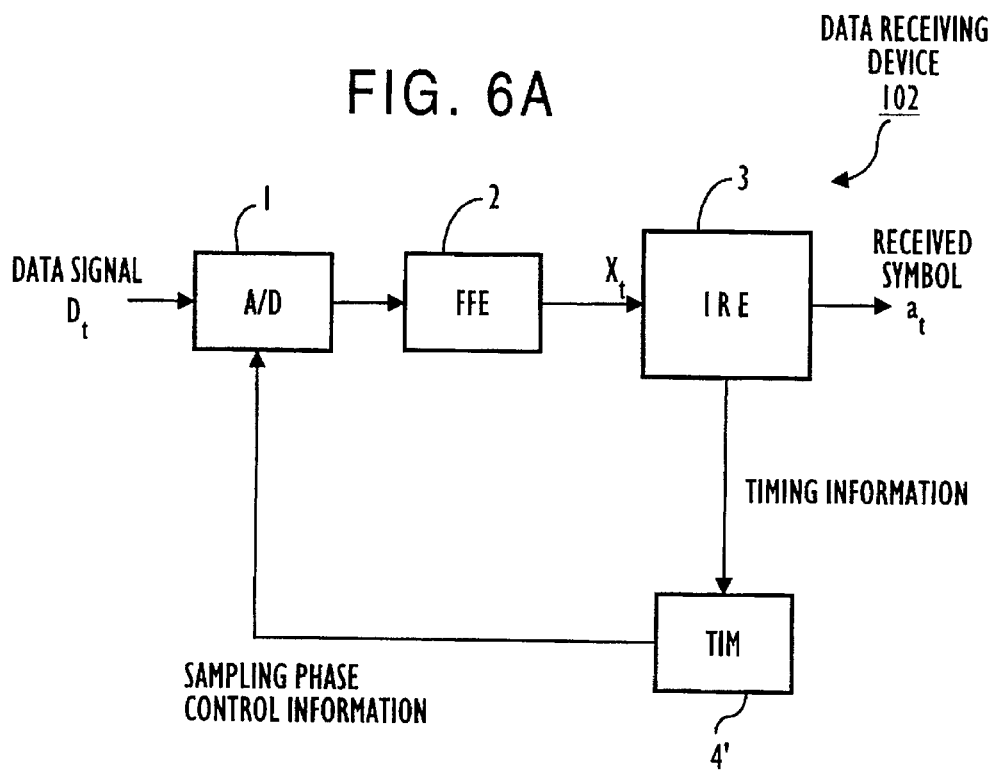
FIG. 6A is a block diagram illustrating a principle of a data receiving device 102 of the present invention.

FIG. 6A is a block diagram illustrating a principle of a data receiving device (102) of the present invention. In FIG. 6A, the same reference numeral as in FIG. 1 designates the same circuit or unit as in FIG. 1. The data receiving device 102 principally consists of A/D 1, FFE 2, IRE 3 and TIM 4' in which A/D 1, FFE 2 and IRE 3 have the same function respectively as those in the data receiving device 101 of the related art shown in FIG. 1. The TIM 4' is one of the subjects of the present invention, and the data receiving device 102 including TIM 4' is a first embodiment of the present invention. Masking circuits, not depicted in FIG. 6A, associated with TIM 4' are other subjects of the present invention. The masking circuits will be described later as a second and a third embodiment of the present invention, respectively.

Figure 6B:
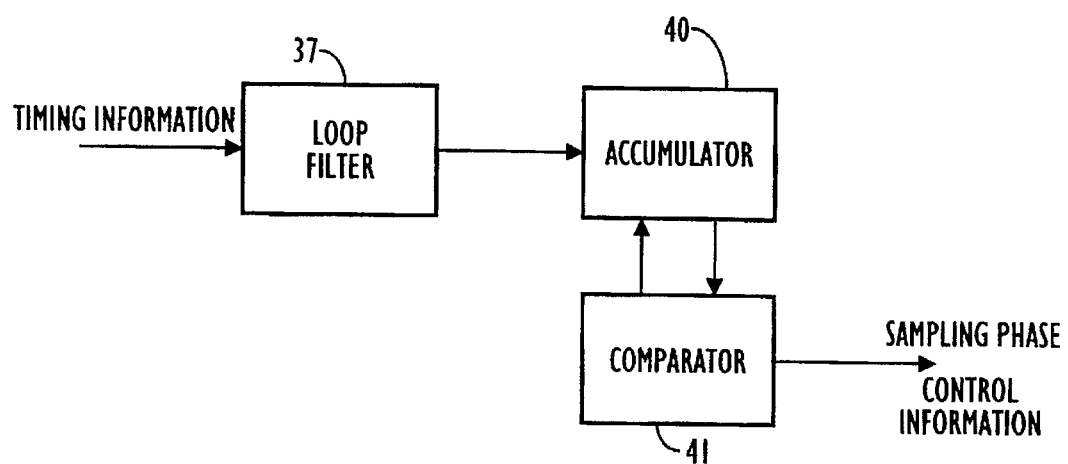
FIG. 6B is a block diagram illustrating a principle of TIM 4' of the present invention.

FIG. 6B is a block diagram illustrating a principle of TIM 4'. The TIM 4' consists of: a loop filter (37) for eliminating a high frequency component of the timing information produced from IRE 3 and producing a loop filter output; an accumulator (40) for accumulating the loop filter outputs and producing an accumulated value; and a comparator (41) for comparing the accumulated value with a designated positive or negative threshold value so as to produce the sampling phase control information to A/D 1 and subtracting the designated positive or negative threshold value from the accumulated value, producing a subtracted value so that succeeding accumulation can be performed over the subtracted value.

Figure 7:
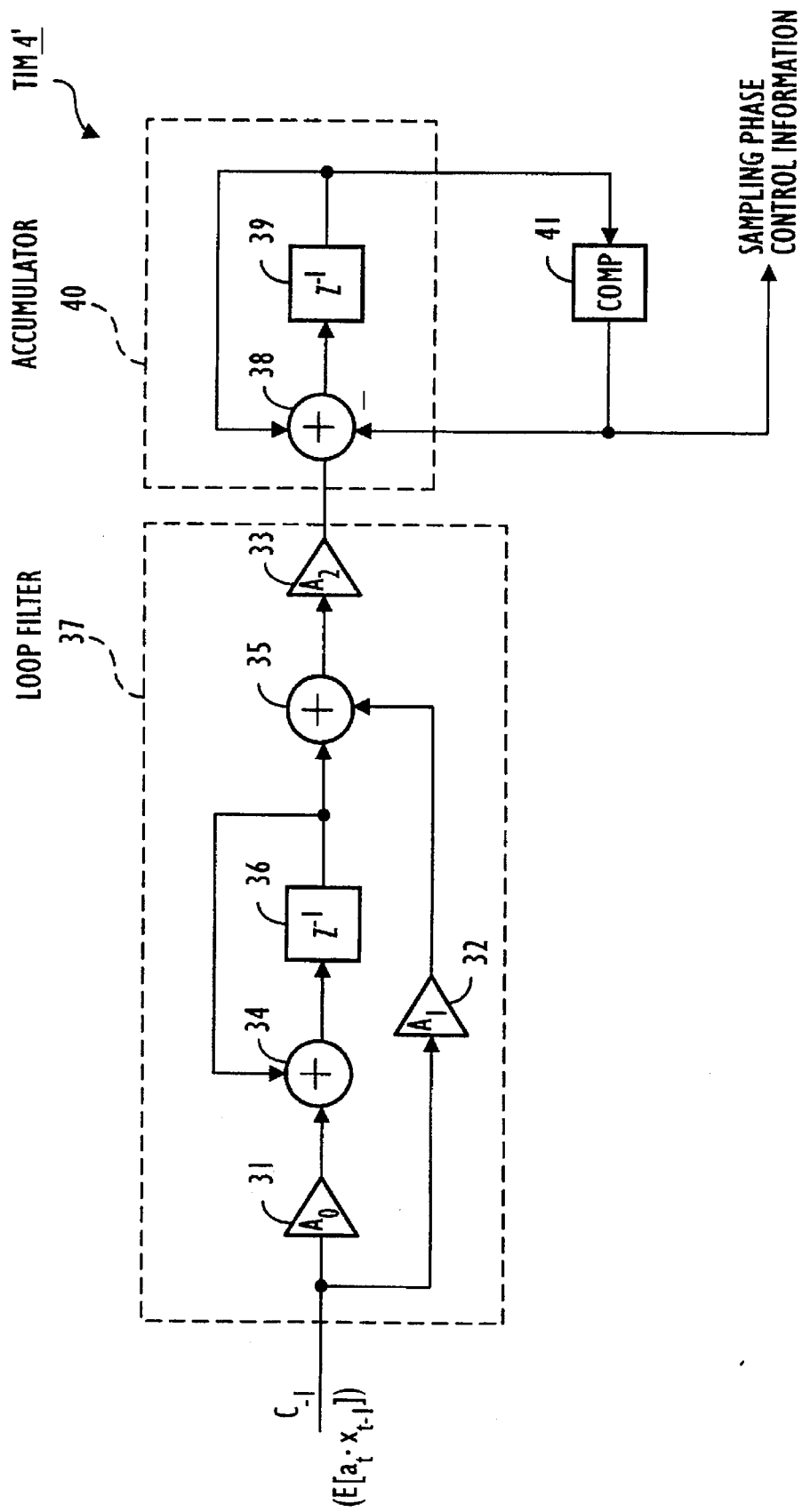
FIG. 7 is a block diagram of TIM 4'.

FIG. 7 is a block diagram of TIM 4'. The loop filter 37 has low pass characteristics and consists of amplifiers (31, 32 and 33) having gain $A_0$, $A_1$ and $A_2$ respectively, adders (34 and 35) and a register ($Z^{-1}$) (36). The accumulator 40 consists of an adder (38) and a register (39).

By virtue of providing the loop filter 37, a high frequency component of the timing information sent from IRE 3, not depicted in FIG. 7, to TIM 4' is suppressed for eliminating an error component of the timing information.

Figure 8:
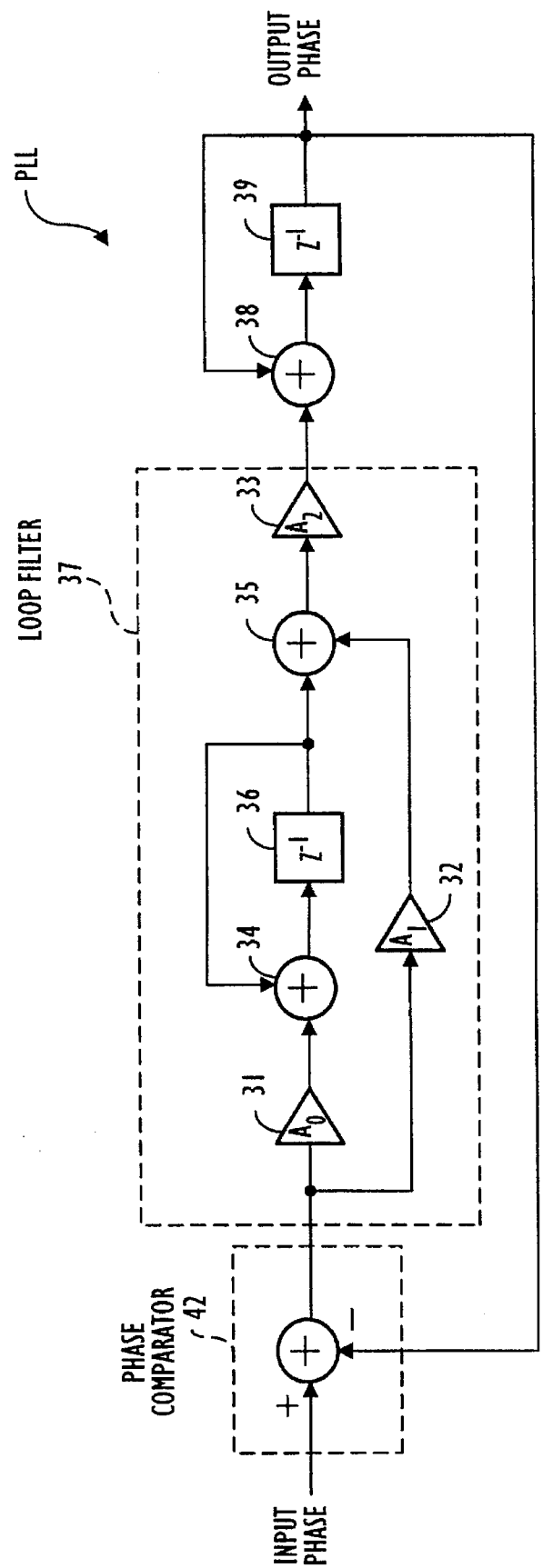
FIG. 8 is a block diagram of a PLL circuit using a loop filter of a digital signal processing type.

If the comparator 41 is removed from TIM 4' in FIG. 7, TIM 4' forms a part of a PLL circuit using a digital loop filter. This is shown in FIG. 8. In FIG. 8, the same reference numeral as in FIG. 7 designates the same unit as in FIG. 7. In FIG. 8, output phase information from the register 39 is fed back to a phase comparator (42). The phase comparator 42 is a subtracter at which the output phase information is subtracted from input phase information, which teaches that the circuit shown in FIG. 8 forms a PLL circuit regarding the phase information.

A transfer function of the PLL circuit shown in FIG. 8 is expressed by the following z-transform:

$$H(Z^{-1}) = \{(1-Z^{-1})A_1A_2Z^{-1} + A_0A_2Z^{-2}\}/[(1-Z^{-1})^2 \cdot \{(1-Z^{-1})A_1 + A_0Z^{-1}\}A_2Z^{-1}].$$

From the above transfer function $H(Z^{-1})$, it will be clear that if constant $A_0$, $A_1$ and $A_2$ are selected properly, the loop filter 37 can be operated as a low-pass filter which eliminates a high frequency component (an error component) of the phase information.

Since TIM 4' has the digital signal processing type loop filter and IRE 3 operates as a phase comparator, it can be said that the data receiving device 102 in FIG. 6A is a PLL circuit which is closely analogous to the PLL circuit shown in FIG. 8. As a result, the output from TIM 4' can be used as the sampling phase control information.

Figure 2:
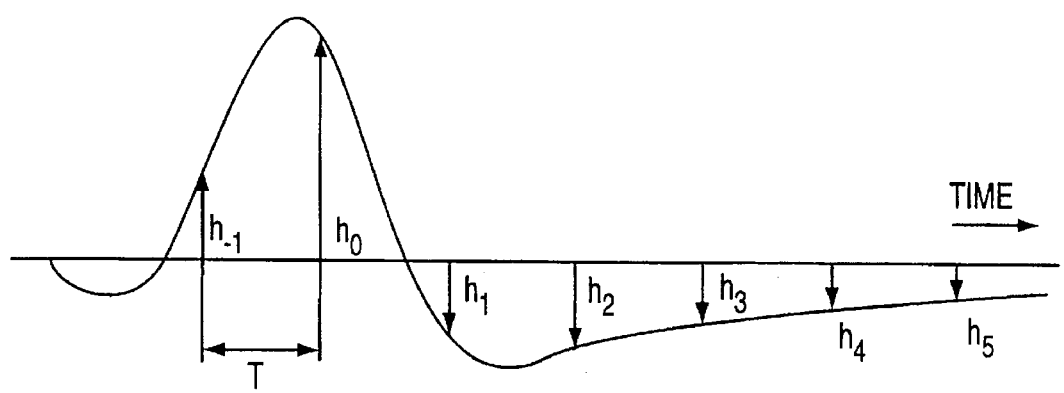
FIG. 2 is an impulse response to a sampled digital signal.
Figure 3:
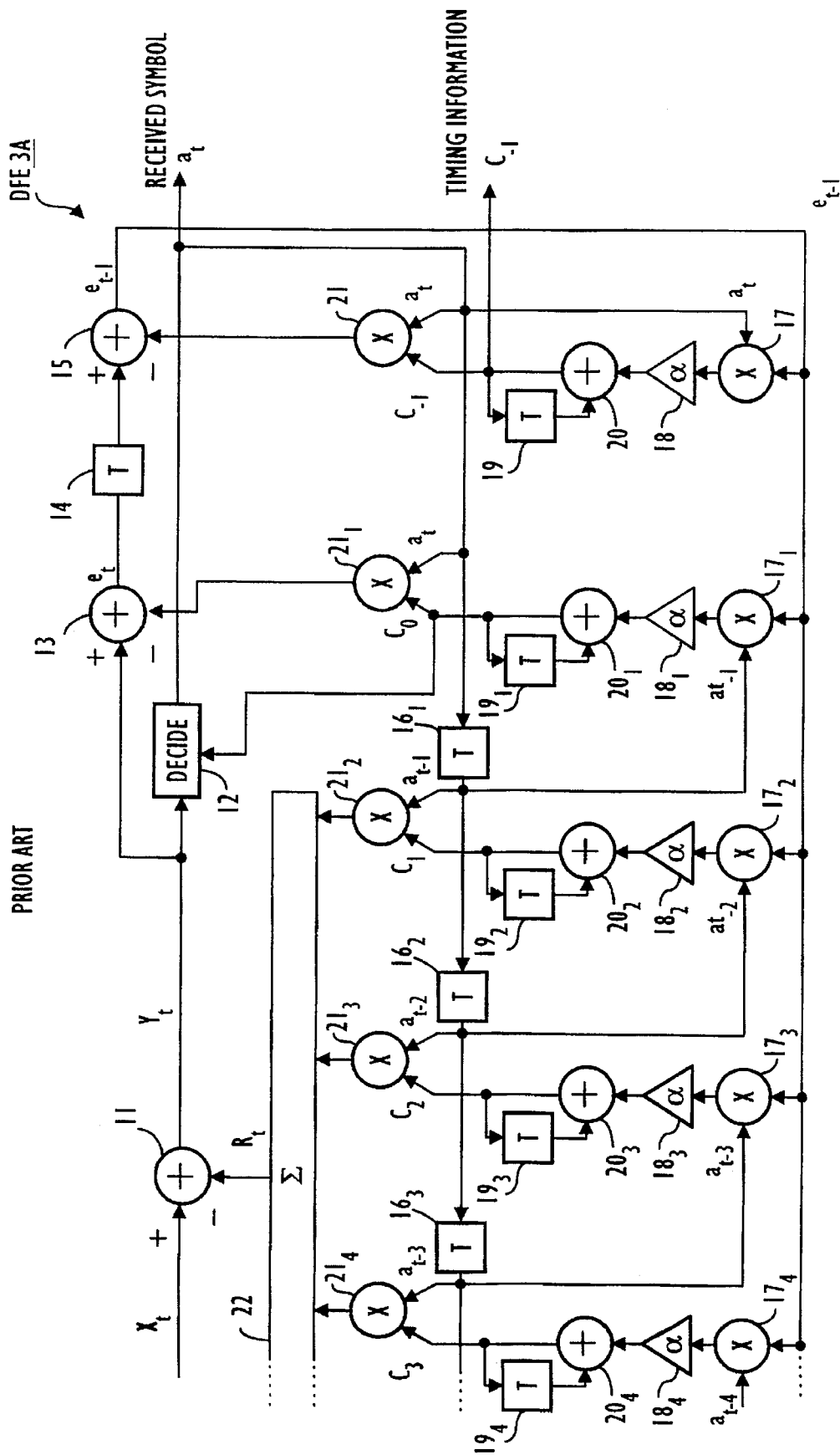
FIG. 3 is a block diagram of a decision feedback equalizer (DFE) 3A.
Figure 4:
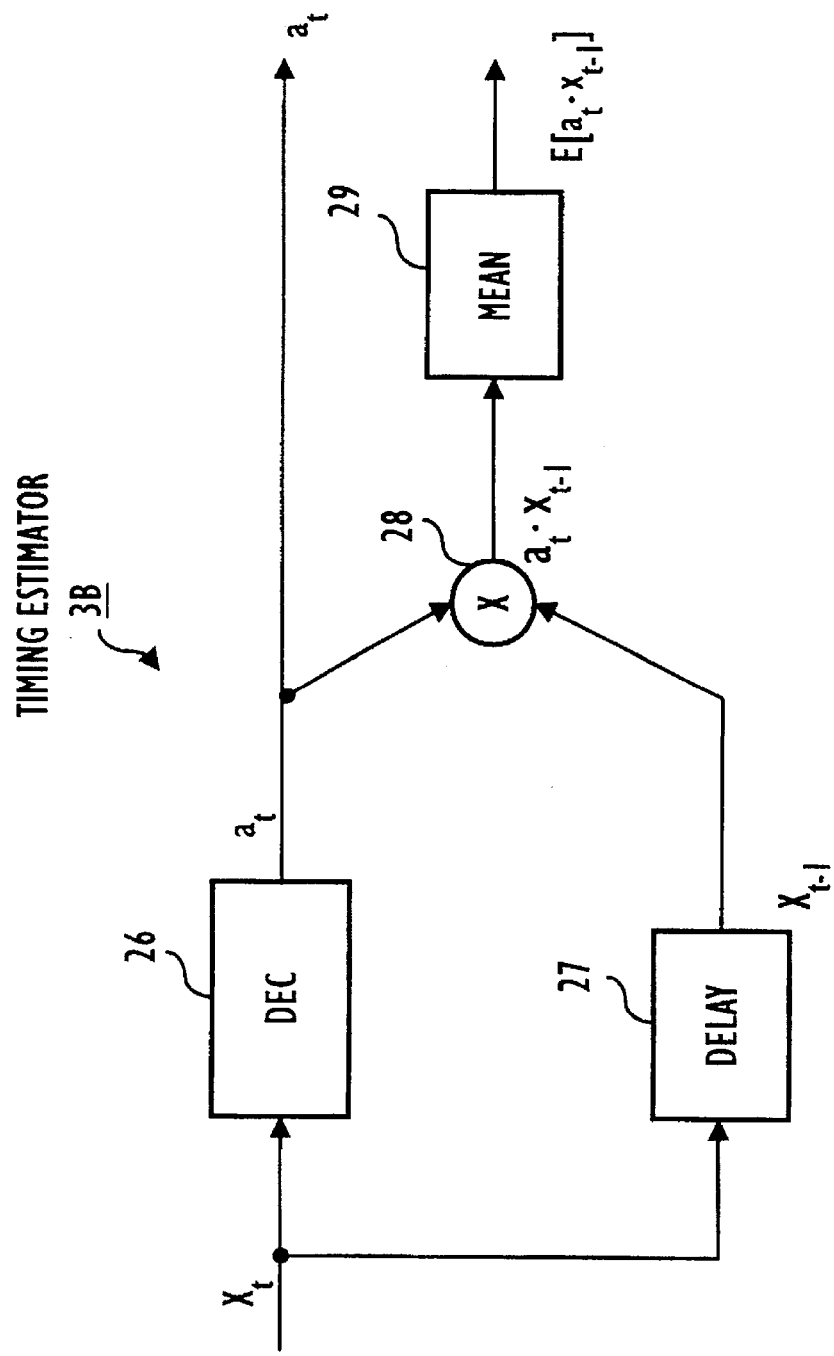
FIG. 4 is a block diagram of a timing estimator 3B.

Since a value of the fractional cursor is varied in linear near the zero-cross point as shown in FIG. 2, the tap coefficient $C_{-1}$ can be used as the timing information. In TIM 4 of the prior art, the sampling phase control information produced every sampling period is only the designated value and the designated value is obtained by integrating only the counted numbers of the timing information exceeding the threshold value. Different from the above prior art TIM 4, the sampling phase control information from TIM 4' is the excess value itself obtained by integrating the values of the timing information exceeding the threshold value. As a result, in TIM 4', even though the sampling phase is deviated far from the correct phase, the timing recovery can be performed quickly in proportion to the amount of the phase deviation. This results in widening the frequency tolerance capable of phase tracking through the data receiving device 102.

Figure 9:
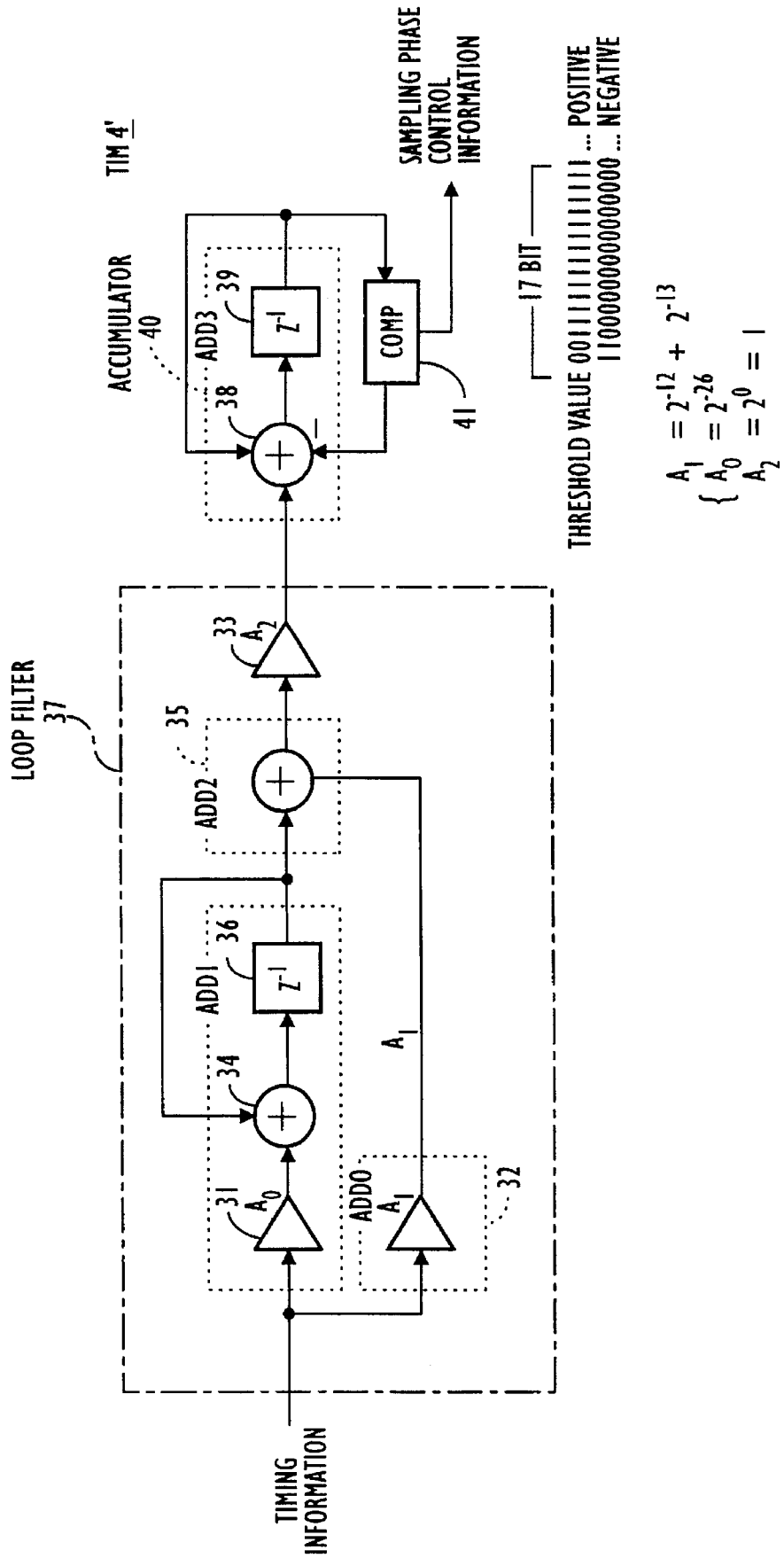
FIG. 9 is a signal flow diagram for TIM 4'.

As an example, concrete digital PLL (DPLL) circuits of TIM 4' and a timing chart associated with the concrete DPLL circuits will describe in reference to FIGS. 9 to 16, under a condition that the timing information (the pre-cursor coefficient) is composed of 18 bits, a positive and a negative threshold value is 17 bits respectively and amplitude $A_1$ is a sum of 12 bit and 13 bit, $A_0$ is 26 bit and $A_2$ has no amplitude (0 bit), as shown in FIG. 9. By virtue of the above condition of amplitude $A_0$, $A_1$ and $A_2$, the DPLL circuit of TIM 4' can be operated as a low-pass filter.

FIG. 9 is a signal flow diagram for TIM 4'. In FIG. 9, the same reference numeral as in FIG. 7 designates the same unit or circuit as in FIG. 7. The signal flow diagram is the same as the block diagram in FIG. 7. However, as seen in FIG. 9, actual operation circuits in TIM 4' are principally formed by adders (ADDs) (0, 1, 2 and 3) encircled by a dotted box respectively.

Figure 10:
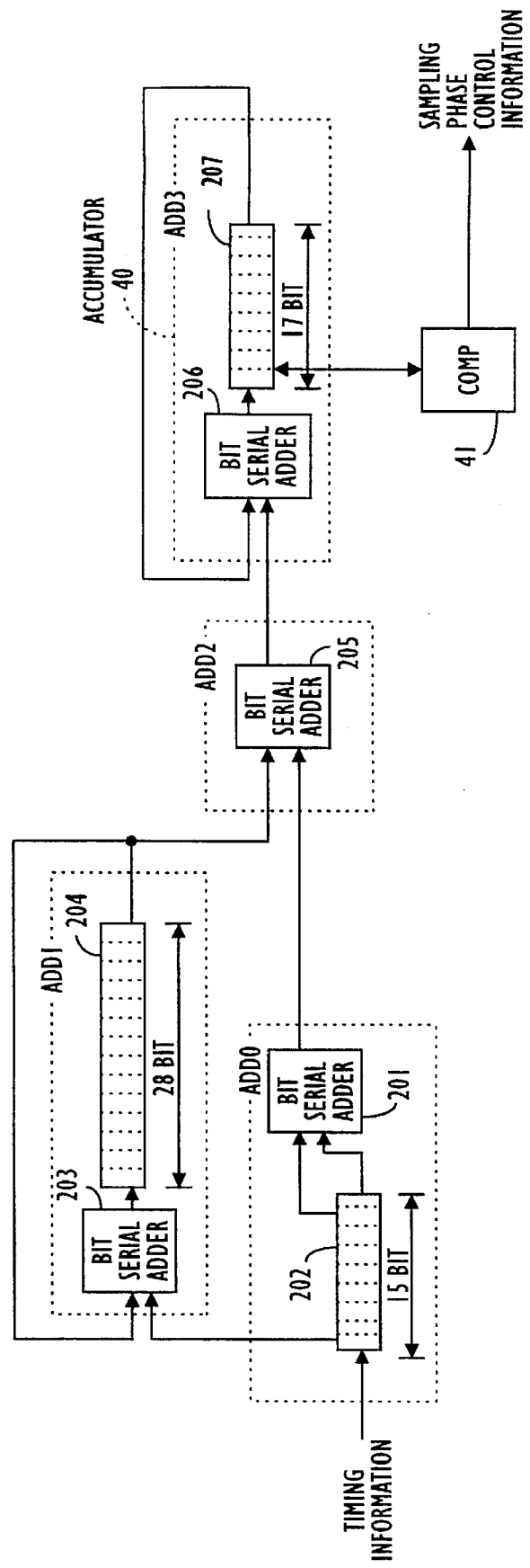
FIG. 10 is a block diagram of an operation circuits in TIM 4'.

FIG. 10 is a block diagram of the operation circuits of TIM 4'. In FIG. 10, the same reference numeral as in FIG. 9 designates the same circuit as in FIG. 9. As shown in FIG. 10, ADD 0 consists of a 15 bit shift register (202) and a bit serial adder (201), ADD 1 consists of a bit serial adder (203) and a 28 bit register (204), ADD 2 consists of a bit serial adder (205) and ADD 3 consists of a bit serial adder (206) and a 17 bit register (207) and has phase control function.

Figure 11:
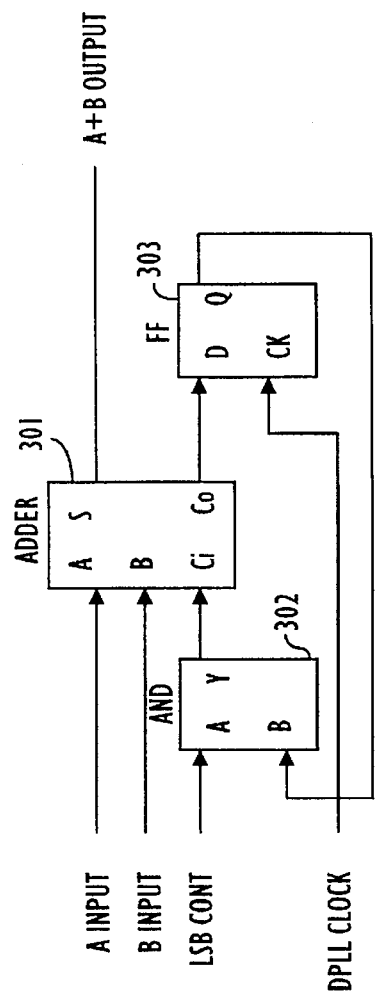
FIG. 11 is a block diagram of a bit serial adder 201, 203, or 206.

FIG. 11 shows a block diagram of the bit serial adder 201, 203, 205 or 206. As shown in FIG. 11, the bit serial adder consists of an adder (ADDER) (301), an AND circuit (AND) (302) and a flip-flop circuit (FF) (303). The ADDER 301 is a full adder having three inputs, A and B for input signals and $C_1$ for carrying. The AND 302 and FF 303 are provided for carrying which is performed under LSB system. An LSB control signal (LSB CONT) fed to AND 302 controls the LSB system so as to make the initial condition to the LSB system stable, and FF 303 operates under a DPLL's clock signal (DPLL CLOCK).

Figure 12:
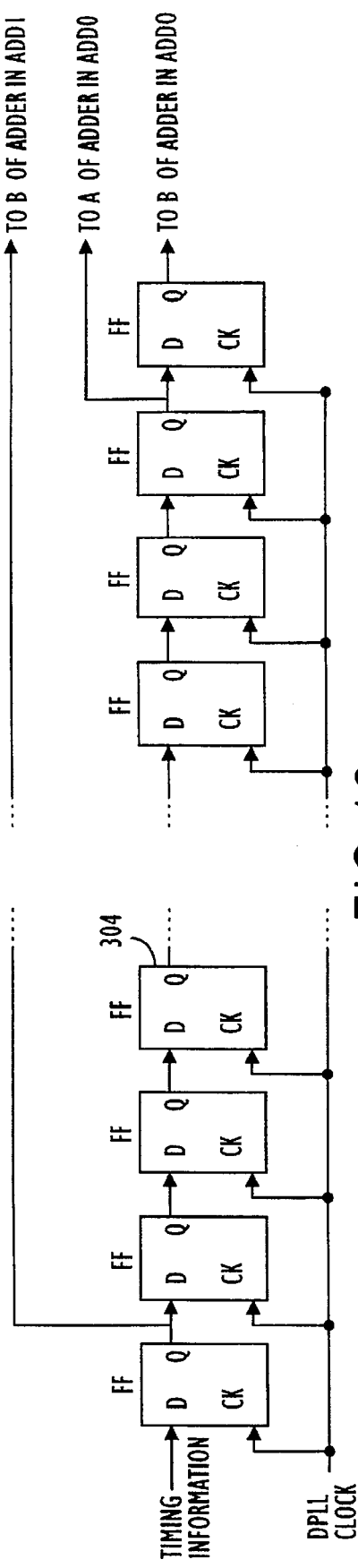
FIG. 12 is a block diagram of a 15 bit shift register 202.

FIG. 12 shows a block diagram of the 15-bit shift register 202. The 15 bit shift register 202 consists of a series of FFs (304) operating under the DPLL CLOCK. When the timing information is sent to the 15 bit shift register 202, three signals are output from the 15 bit shift register 202 to A and B input of ADDER 301 of the bit serial adder 201 in ADD 0 and B input of ADDER 301 of the bit serial adder 203 in ADD 1.

Figure 13:
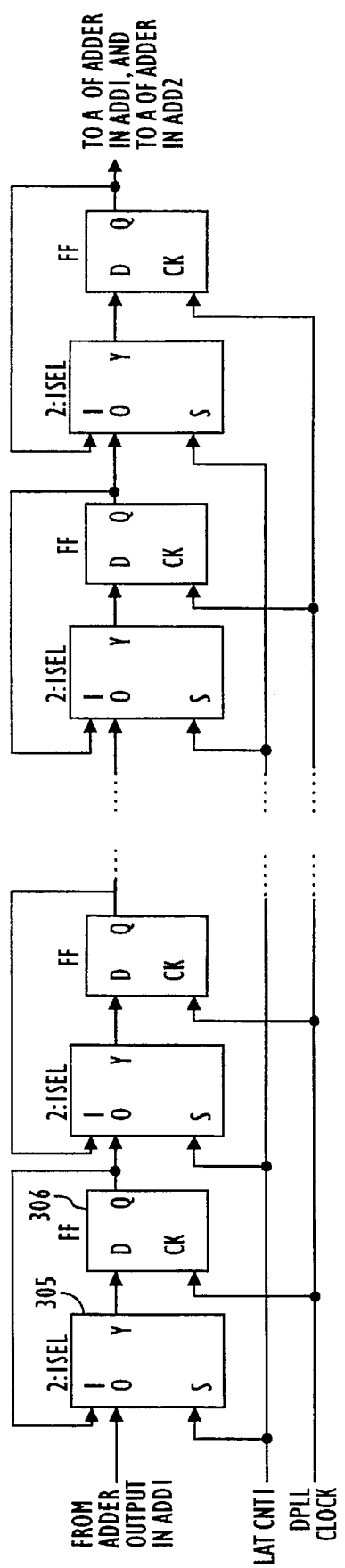
FIG. 13 is a block diagram of a 28 bit register 203.

FIG. 13 shows a block diagram of the 28-bit shift register 204 in ADD 1. The 28 bit register 204 consists of a series of combined circuits each consists of a 2:1 selector (2:1 SEL) (305) and an FF (306). The combined circuit is for holding an input signal in the 2:1 SEL 305 when a latch control signal 1 (LAT CONT 1) is sent to the 2:1 SEL 305. The FF 306 operates under DPLL CLOCK. When an output from the bit serial adder 203 is sent to the 28 bit register 204, an output of the 28 bit register 203 is sent to A input of ADDER 301 of the bit serial adder 203 in ADD 1 and A input of ADDER 301 of the bit serial adder 205 in ADD 2.

Figure 14:
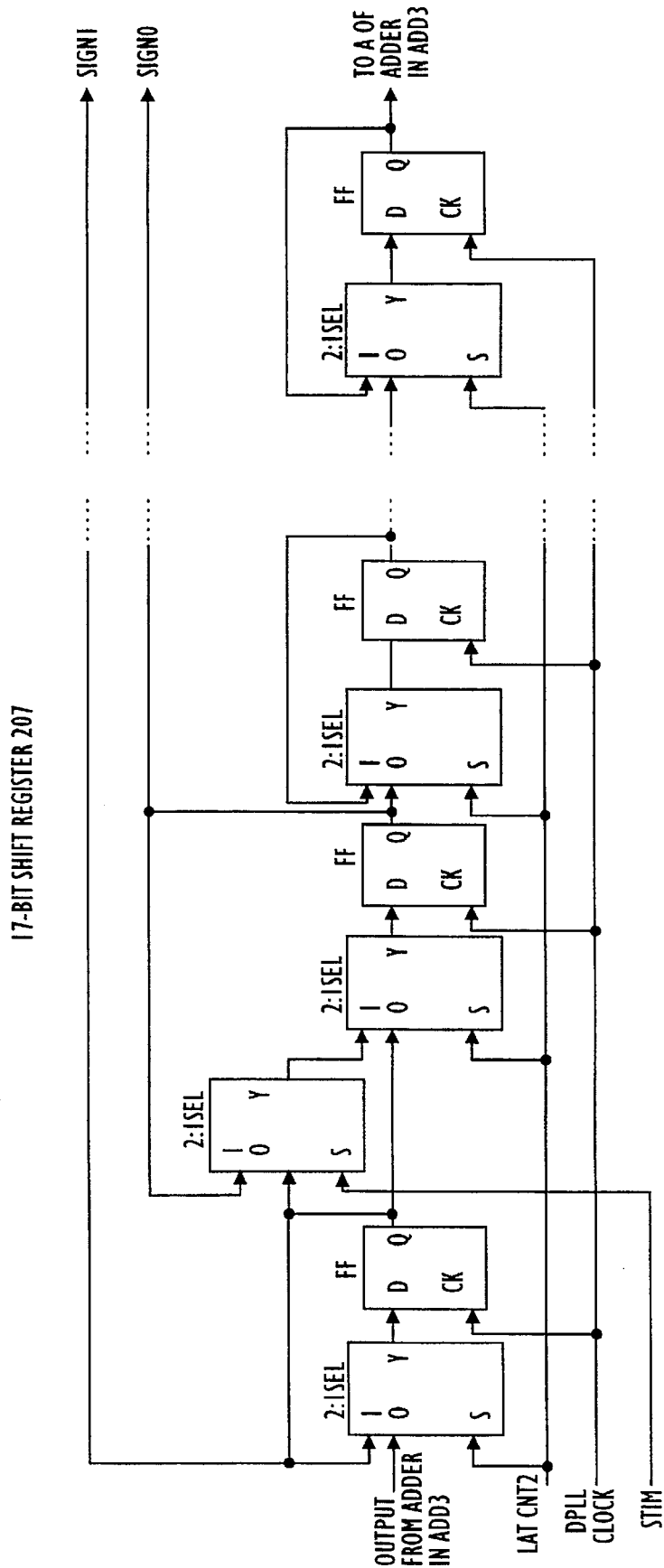
FIG. 14 is a block diagram of a 17 bit register 207.

FIG. 14 shows a block diagram of a 17-bit register 207 in ADD 3. The 17 bit register 203 consists of a series of the combined circuits each consists of the 2:1 SEL 305 and the FF 306, which is the same as the 28-bit register 204 in FIG. 13 except that the selection is performed at 2:1 SEL 305 under LATCH CNT 2 and a signal (S1), which is an MSB, is output from a first stage of the combined circuits and a signal (S0), which is a second bit from MSB, is output from a second stage of the combined circuits. The signal S1 will be called a sign 1 signal (SIGN 1) and the signal S0 will be called a sign 0 signal (SIGN 0) hereinafter. The SIGN 1 and SIGN 0 are sent to a phase control function circuit shown in FIG. 15. An output of the bit register 207 in ADD 3 is sent to COMP 41 (see FIG. 9) and A input of ADDER 301 in the bit serial adder 206 of ADD 3. A signal STIM is a timing signal for rewriting SIGN 0 when the overflow occurs. Usually, the signal STIM is "1", however, when the signal STIM is "0" and the overflow occurs, SIGN 0 is rewritten and when the signal STIM is "0" and the overflow does not occur, SIGN 0 is not rewritten.

Figure 15:
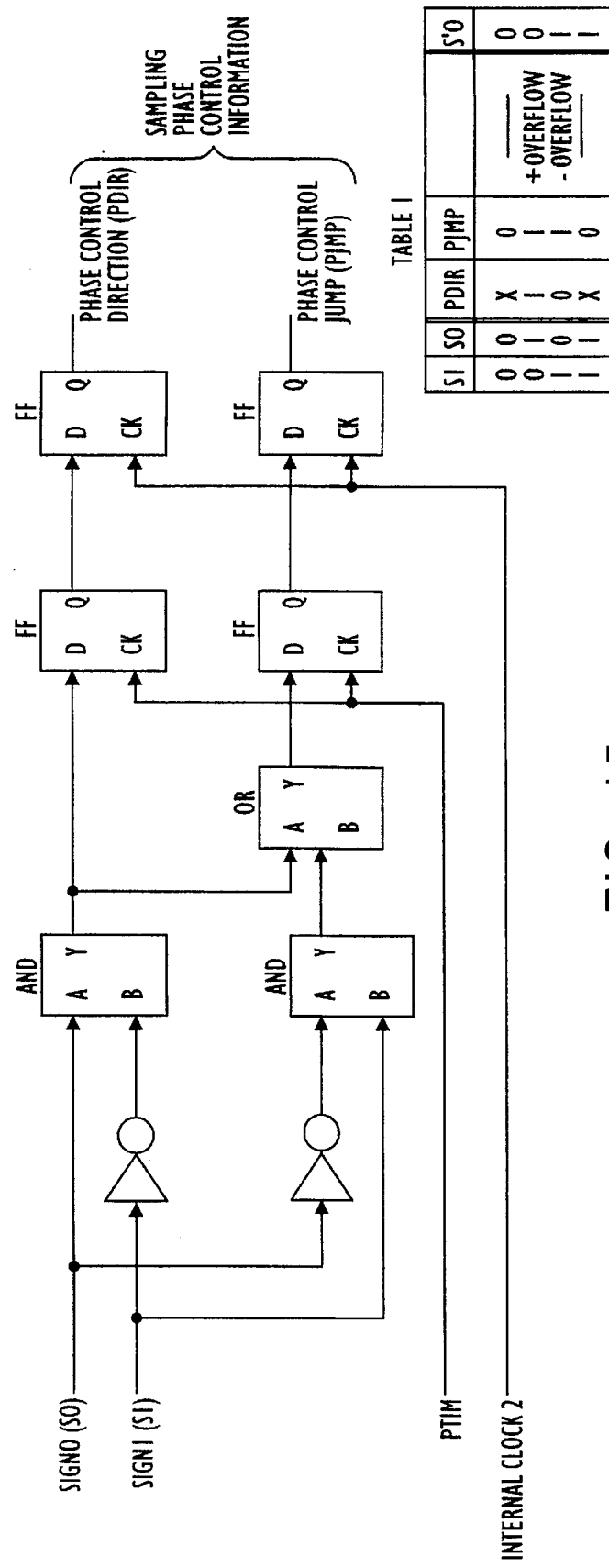
FIG. 15 is a block diagram of a phase control function circuit.

FIG. 15 shows a block diagram of a phase control function circuit (COMP) 41 for producing the sampling phase control information consisting of a phase control direction signal (PDIR) and a phase control jump signal (PJMP). The PDIR informs control direction of the sampling phase. If the PDIR is "1", the sampling phase is required to be shifted forward and if the PDIR is "0", the sampling phase is required to be shifted backward. The PJMP informs whether the phase control is required or not. If the PJMP is "1", the phase control is required and if the PJMP is "0", the phase control is not required. The phase control function circuit 41 connected with ADD 8 and consists of two inverters, AND circuits, an OR circuit and four FFs. Receiving SIGN 0 (S0) and SIGN 1 (S1), the phase control function circuit produces the PDIR and the PJMP. The PDIR and PJMP are presented on TABLE 1 with respect to S1 and S0. For example, when S1 and S0 are "0" and "1" respectively, "1" and "1" are produced as PDIR and PJMP respectively as shown in TABLE 1. This means that since "0 1" is over the positive threshold value "0 0", at the MSB and the second bit from MSB (see the positive threshold value in FIG. 9) respectively, the sampling phase must be shifted in accordance with PJMP "1" so as to be shifted backward in accordance with PDIR "1". When S1 and S0 are "1" and "0" respectively, "0" and "1" are produced as PDIR and PJMP respectively. This means that since "1 0" is less than the negative threshold value "1 1" at the MSB and the second bit from the MSB, the sampling phase must be shifted in accordance with PJMP "1" so as to be shifted forward in accordance with PDIR "0". As a result of shifting backward or forward thus, S0 becomes S'0 as shown in TABLE 1. A signal PTIM is a timing signal for obtaining S0 and S1.

Figure 16A:
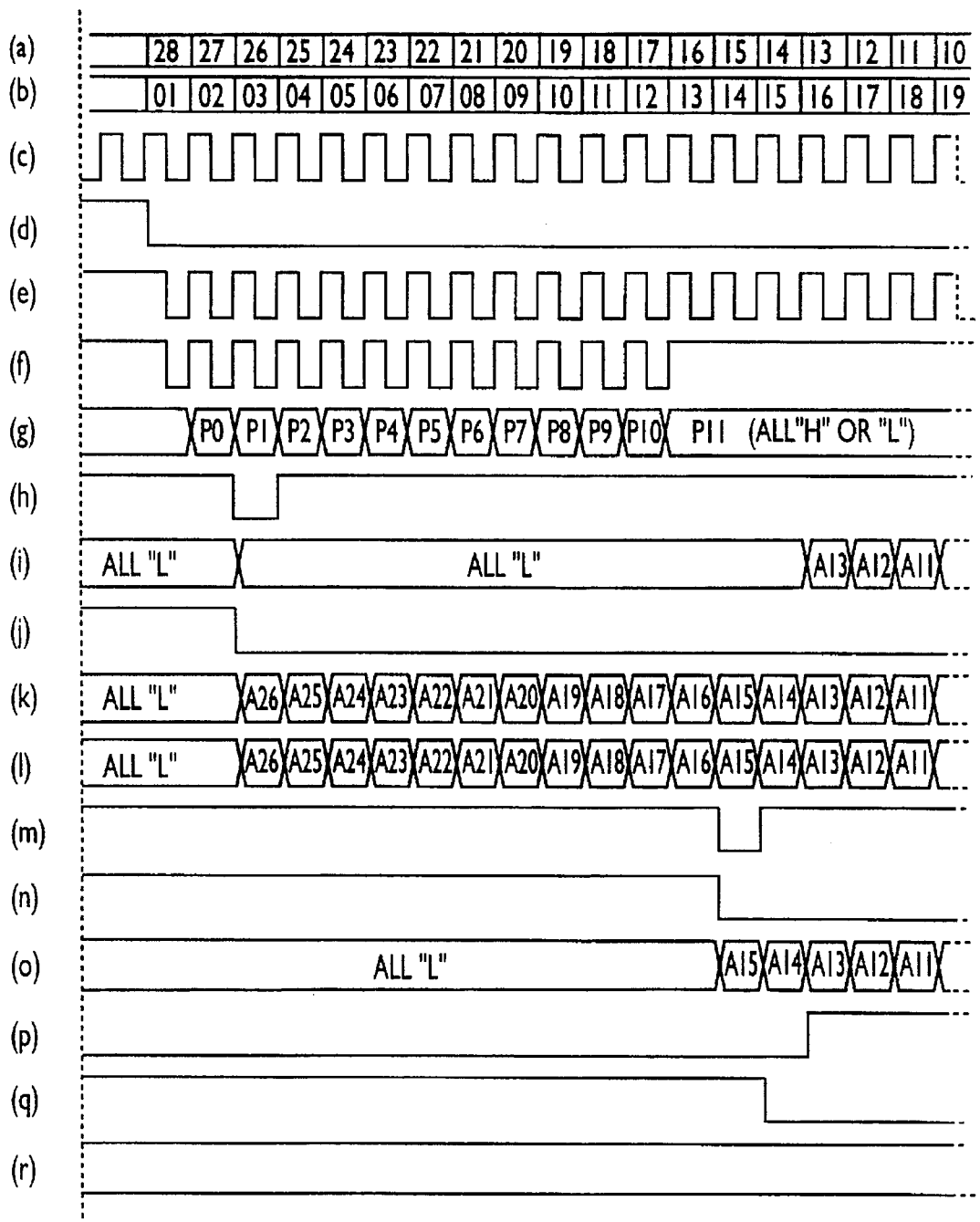
FIG. 16 is a timing chart for description of FIG. 11 to FIG. 15.
Figure 16B:
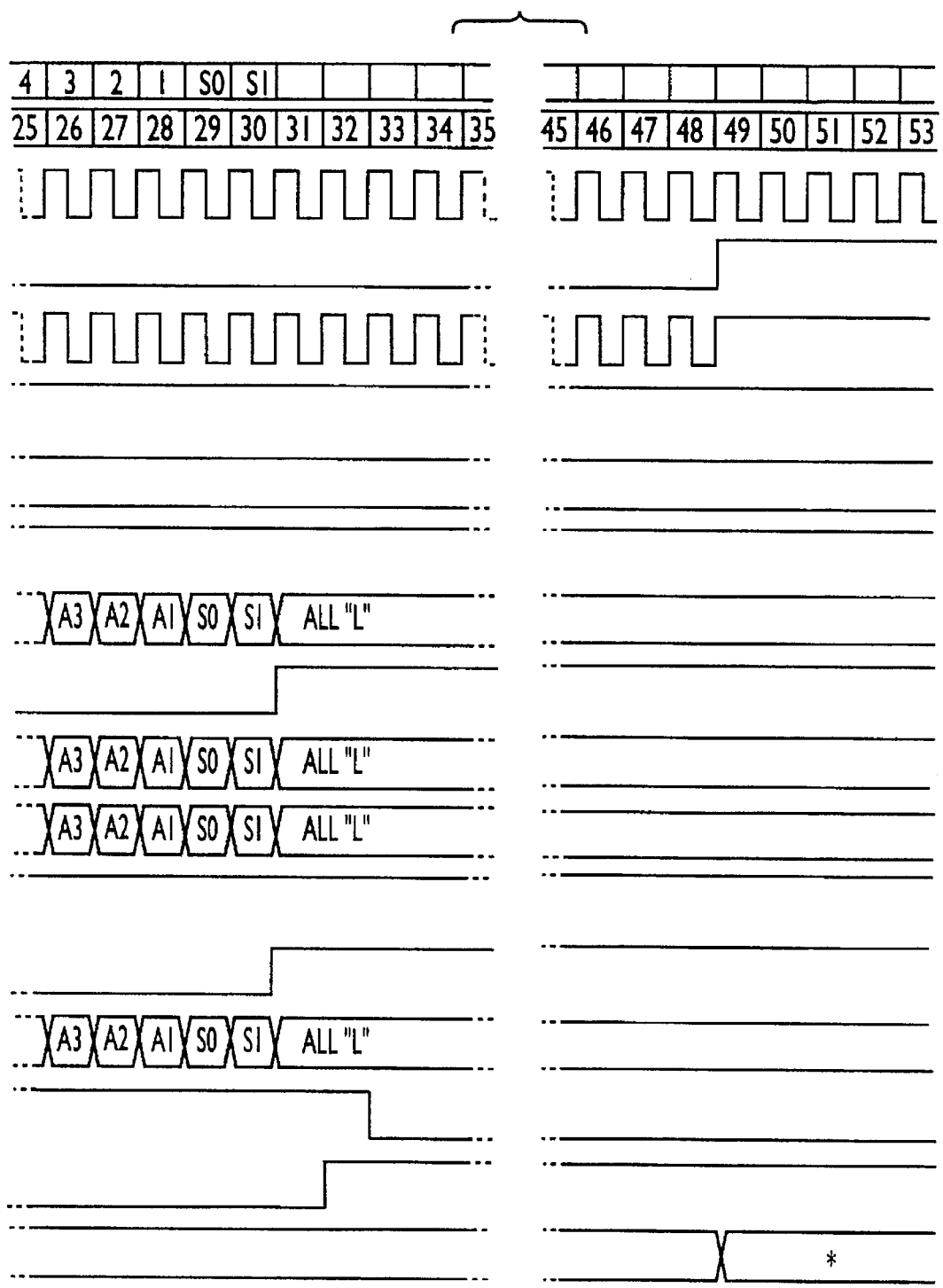

A timing chart for the above description on FIG. 11 to FIG. 15 is shown in FIG. 16.

On TABLE 1, each chart will be explained in order of alphabet from (a) to (s), as follows:

(a) is an operation digit position so that 28 is LSB and S1 is MSB;

(b) is a cycle position;

(c) is an internal clock (INT CLOCK) 1 generated in the data receiving device 102 independently from the received symbol cycle;

(d) is INT CLOCK 2 for designating an operating period of DPLL, synchronizing with the A/N conversion;

(e) is a DPLL CLOCK generating during INT CLOCK 2, synchronizing with INT CLOCK 1;

(f) is a timing information clock for the timing information;

(g) is the timing information fed from IRE 3 to TIM 4' (DPLL);

(h) is an LSB control signal used to ADDs 1 and 2;

(i) is an output signal from ADD 0;

(j) is a latch control signal 1 (LAT CNT 1) for producing the outputs from ADDs 1 and 2;

(k) is the output from ADD 1;

(l) is the output from ADD 2;

(m) is an LSB control signal (LSB CNT) for ADD 3;

(n) is a latch control signal 2 (LAT CNT 2) for producing the outputs from ADD 3;

(o) is the output from ADD 3;

(p) is a timing signal STIM for rewriting SIGN 0 when STIM is "0" and the overflow occurs;

(q) is a timing signal PTIM for obtaining S0 and S1 after the timing signal PTIM changes from "0" to "1"; and (r) is the sampling phase control information generated at a point "*" after the INT CLOCK 2.

Figure 17:
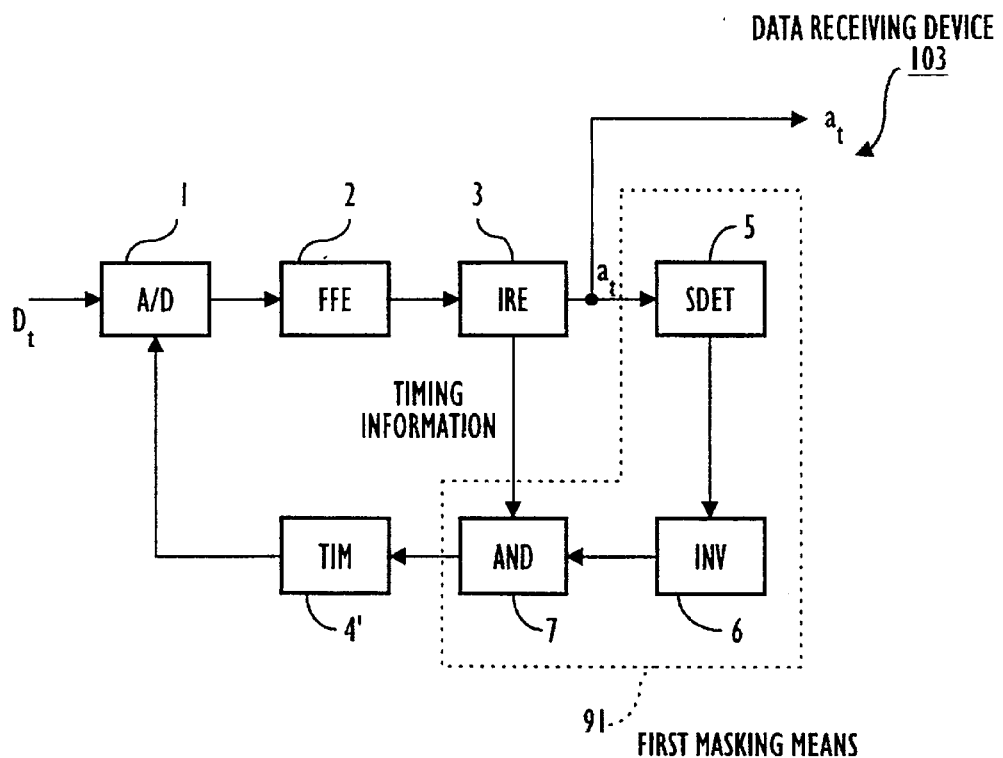
FIG. 17 is a block diagram of a data receiving device 103 of a second preferred embodiment of the present invention, including first masking means 91.

FIG. 17 is a block diagram of a data receiving device (103) including first masking means (91). The data receiving device 103 is a second preferred embodiment of the present invention. In FIG. 17, the same reference numeral as in FIG. 6A designates the same unit as in FIG. 6A. The first masking means 91 consists of a no-signal detecting circuit (SDET) (5), an inverter (INV) (6), and an AND circuit (AND) (7). The SDET 5 detects that there is continuously "0" datum or no-data signal in the received symbol at and produces "0" information to INV 6. The INV 6 inverts the "0" information so as to produce no signal to AND 7. The AND 7 usually operates so that the timing information is sent from IRE 3 to TIM 4'. However, when AND 7 receives the no signal from INV 6, AND 7 masks the timing information so as not to send the timing information to TIM 4'. When the received data signal is transmitted under AMI code, there is a case where the receiving device receives the continuous "0" datum. Since the continuous "0" arrives thus, the tap coefficient $C_{-1}$ is not renewed. As a result, the same value of the tap coefficient $C_{-1}$ would be continually sent to TIM 4', bringing TIM 4' in a state of timing recovery operation in accordance with the tap coefficient $C_{-1}$. However, by virtue of the first masking means 91, the timing information is forcibly made "0". As a result, the sampling phase control information sent from TIM 4' to A/N 1 holds the sampling phase in what it used to be. This results in locking the sampling phase, bringing the data receiving device into a stable condition of a free running PLL.

Figure 18:
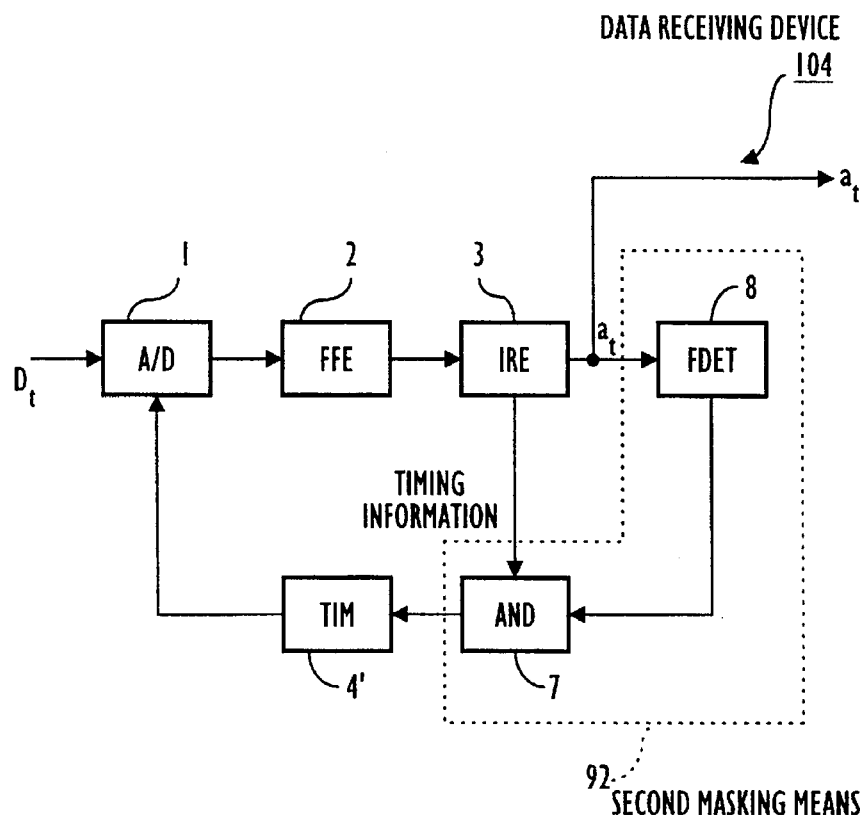
FIG. 18 is a block diagram of a data receiving device 104 of a third preferred embodiment of the present invention, including second masking means 92.

FIG. 18 is a block diagram of a data receiving device (104) including second masking means (92). The data receiving device 104 is a third preferred embodiment of the present invention. In FIG. 18, the same reference numeral as in FIG. 6A designates the same unit as in FIG. 6A.

The data receiving device 104 is a device used in a time compression multiplex system. In accordance with the time compression multiplex system, the data receiving device 104 receives no-signal when a device including the data receiving device 104 is in a transmission mode. At this time, the data receiving device 104 receives a frame for informing that the data receiving device 104 receives no data signal. Therefore, in the third embodiment, the second masking means 92 is to mask the timing information when the frame is detected.

In FIG. 18, the second masking means 92 consists of a frame detecting circuit (FDET) (8) and AND 7. The FDET 8 detects the frame from the received symbol at and produces a frame detection signal when the frame is detected then sends the frame detection signal to AND 7. Receiving the frame detection signal from AND 7, AND 7 masks the timing information so that the timing information is not sent to TIM 4 from IRE 3. By virtue of the second masking means 92, the sampling phase control information from TIM 4' is forcibly made "0". As a result, the sampling phase control information holds the sampling phase in what it used to be, bringing the data receiving device into a stable condition of a free running PLL.

What is claimed is:

1. A data receiving device (102) for reproducing a received symbol from a data signal transmitted through a transmission line and received at the data receiving device (102), said data receiving device (102) comprising:

an analog-to-digital converter (1) for converting the received data signal to a sampled digital signal by sampling the received data signal every period of the received symbol;

an impulse response estimating unit (3) for estimating an impulse response provided in consideration of the transmission line, for reproducing the received symbol from the sampled digital signal by using a main-cursor of the impulse response and producing timing information from the sampled digital signal by using a pre-cursor of the impulse response; and a timing recovery circuit (4') for producing sampling phase control information every period of the received symbol by using the timing information received from said impulse response estimating unit, wherein said timing recovery circuit (4') comprises:

a loop-filter (37) for eliminating a high frequency component of the timing information and producing a loop-filter output;

an accumulator (40) for accumulating the loop-filter output every period of the received symbol and producing an accumulated value; and a comparator (41) for producing the sampling phase control information by comparing the accumulated value with a threshold value and subtracting the threshold value from the accumulated value, said timing recovery circuit producing said sampling phase control information by: eliminating said high frequency component from the timing information, producing an eliminated value as said loop-filter output; accumulating the eliminated value, producing said accumulated value; and comparing the accumulated value with said threshold value and subtracting the threshold value from the accumulated value when the accumulated value is larger than the threshold value in absolute value, producing a subtracted value, said threshold value being a positive constant value corresponding to a positive value of the timing information, said threshold value being a negative constant value corresponding to a negative value of the timing information, and said subtracted value being the sampling phase control information which is to be sent to said analog-to-digital converter (1) for controlling a phase of sampling performed at said analog-to-digital converter (1) to reproduce the received symbol properly.

2. A data receiving device (102) according to claim 1, wherein the impulse response estimating unit (3) comprises a decision feedback equalizer (3A) for producing the received symbol from the sampled digital signal under a decision made by applying the main-cursor to an equalized output (YK) obtained by subtracting an intersymbol interference component due to post-cursors of the impulse response from the sampled digital signal and estimating the impulse response in accordance with tap coefficients, which correspond to the pre-cursor, main-cursor and post-cursors respectively, updated every period of the symbol by using a residual error obtained by subtracting a main signal component due to the main-cursor and a pre-cursor component due to the pre-cursor from the equalized output ($Y_K$), the tap coefficient of the pre-cursor being used as the timing information.

3. A data receiving device (102) according to claim 1, wherein the impulse response estimating unit (3) comprises a timing estimator (3B) for producing the received symbol from the sampled digital signal under decision made by using the main-cursor and a mean value of a result made by multiplying the received symbol by the sampled digital signal delayed as much as one period of the sampling, said mean value being used as the timing information signal.

4. A data receiving device (102) according to claim 1 further comprising masking means (91) for masking the timing information to be sent from the impulse response estimating unit (3) to the timing recovery circuit (4'), when no-signal is continuously included in the received data signal.

5. A data receiving device (102) according to claim 4, wherein said masking means (91) comprises: a no-signal detecting circuit (5) for detecting the no-signal in the received data signal; and an AND circuit (7) for masking the timing information when said no-signal detecting circuit (5) detects the no-signal.

6. A data receiving device (102) according to claim 1 further comprising masking means (92) for masking the timing information to be sent from the impulse response estimating unit (3) to the timing recovery circuit (4'), when the data receiving device (102) operates in a ping-pong system and a frame is included in the received data signal.

7. A data receiving device (102) according to claim 6, wherein said masking means (92) comprises:

a frame detecting circuit (8) for detecting a frame in the received data signal; and an AND circuit (7) for masking the timing information when said frame detecting circuit (8) detects the frame.

* * * * *